(12) United States Patent
Ashjaee

(10) Patent No.: US 6,594,912 B2
(45) Date of Patent: Jul. 22, 2003

(54) ELECTRONIC PLUMB INDICATOR FOR MONOPOLES, SURVEY POLES, GLOBAL POSITIONING ANTENNAS AND THE LIKE

(75) Inventor: Javad Ashjaee, Saratoga, CA (US)

(73) Assignee: Topcon GPS LLP, Pleasanton, CA (US)

( * ) Notice: Subject to any disclaimer, the term of this patent is extended or adjusted under 35 U.S.C. 154(b) by 0 days.

(21) Appl. No.: 09/839,468

(22) Filed: Apr. 20, 2001

(65) Prior Publication Data

US 2002/0011004 A1 Jan. 31, 2002

Related U.S. Application Data

(60) Provisional application No. 60/199,078, filed on Apr. 20, 2000.

(51) Int. Cl.[7] ................................................. G01C 9/06
(52) U.S. Cl. ........................ 33/366.24; 33/365; 33/391
(58) Field of Search ..................... 33/351, 365, 366.11, 33/366.12, 366.15, 366.18, 366.21, 366.24, 377, 390, 391, 392, 395, 401

(56) References Cited

U.S. PATENT DOCUMENTS

| 3,372,386 | A | 3/1968 | Klinger ........................ 33/391 |
| 4,603,484 | A | 8/1986 | Strothmann .............. 33/366.22 |
| 4,923,015 | A | 5/1990 | Barsby et al. ........... 33/366.24 |
| 5,072,615 | A | 12/1991 | Nawrocki ................ 33/366.14 |
| 5,673,491 | A | 10/1997 | Brenna et al. ................ 33/391 |

Primary Examiner—G. Bradley Bennett
(74) Attorney, Agent, or Firm—Coudert Brothers LLP

(57) ABSTRACT

Disclosed are electronic plumb indicators for monopoles, survey poles, global positioning antennas and the like. A exemplary plumb indicator comprises a substrate, a plumb bob suspended by a thread (e.g., wire, cable, string, etc.) and disposed over a first surface of the substrate, and a probe. The substrate has an array of conductive pads disposed over its first surface, preferably in a regular pattern. The probe has a first body portion held by the plumb bob but allowed to move freely in the vertical direction, and a conductive tip disposed between the plumb bob and the first surface of the substrate. The probe tip makes contact with the first surface of the substrate, and contacts one or more pads in normal operation. The pads may be scanned electronically to determine the location of the probe tip and plumb bob with respect to the substrate.

20 Claims, 4 Drawing Sheets

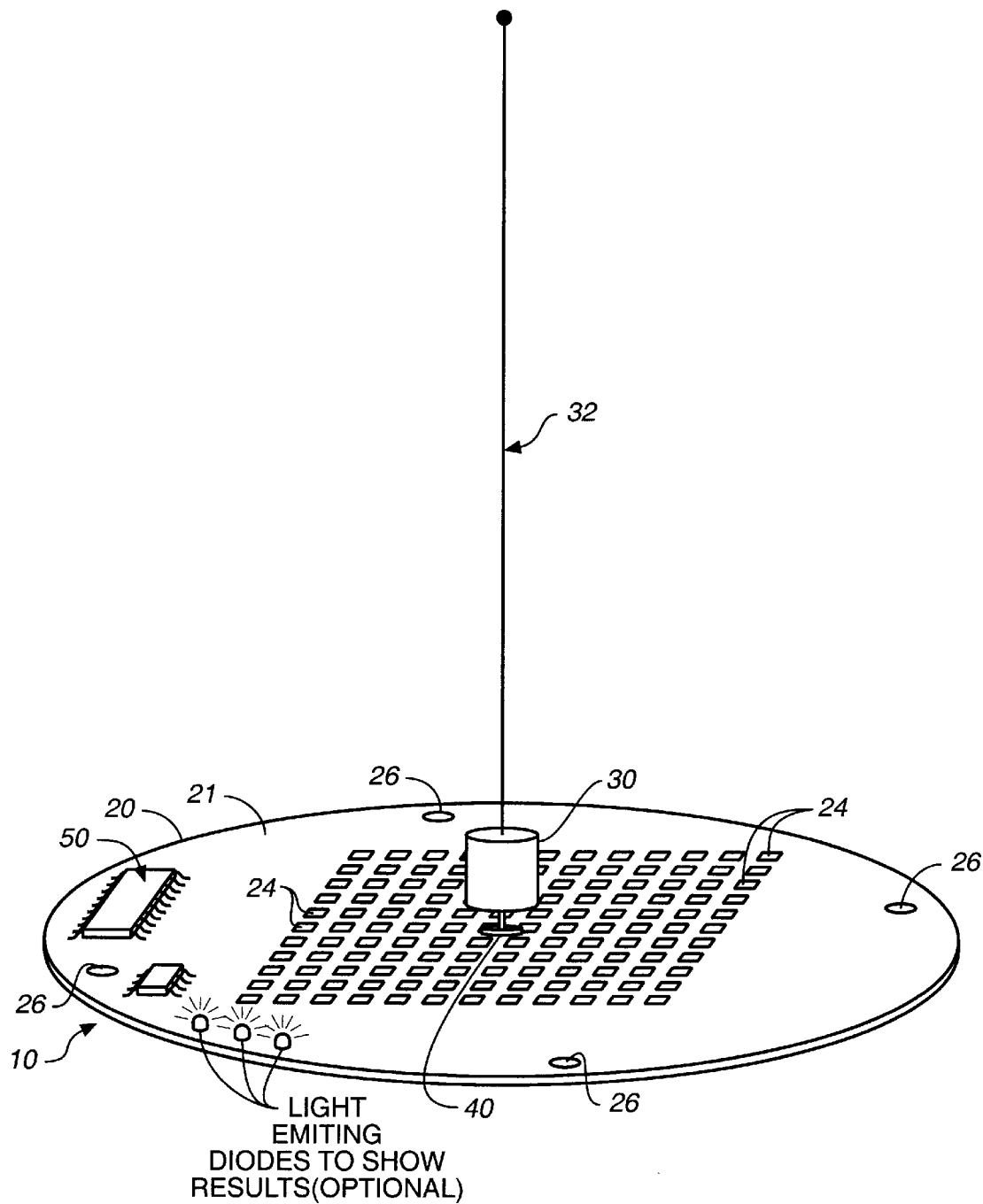
FIG._1

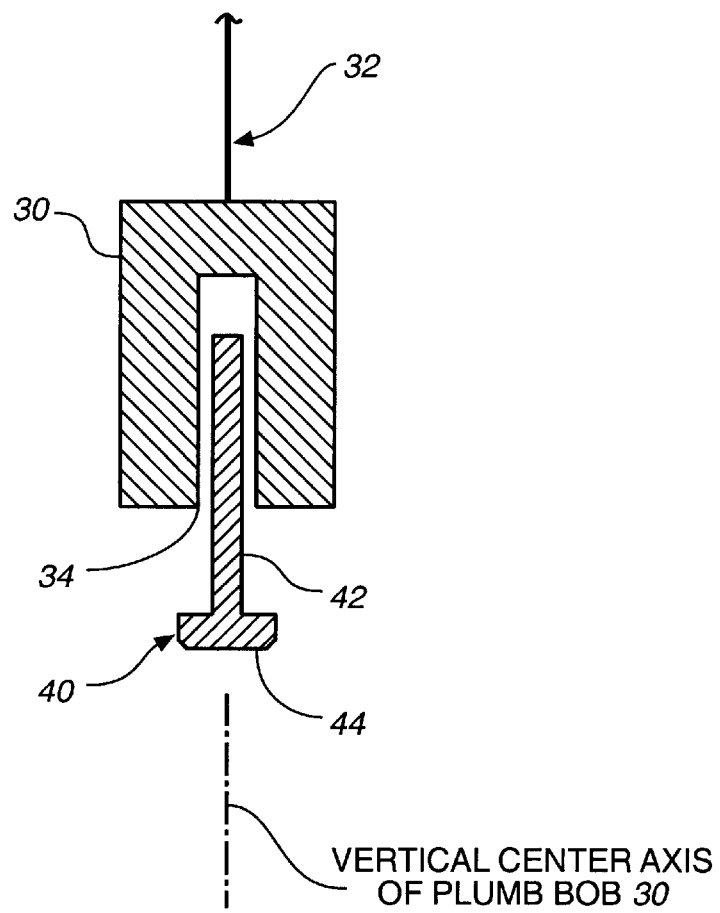
FIG._2
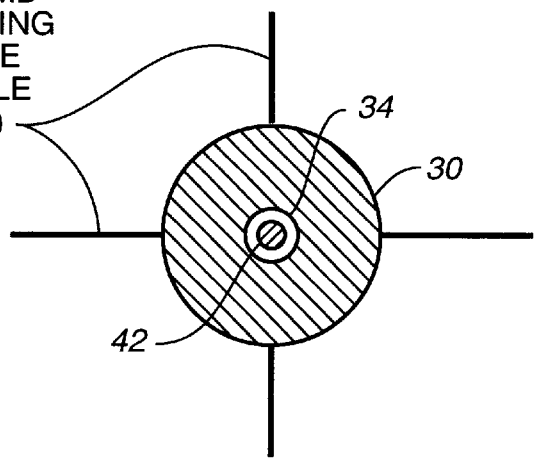
FIG._4

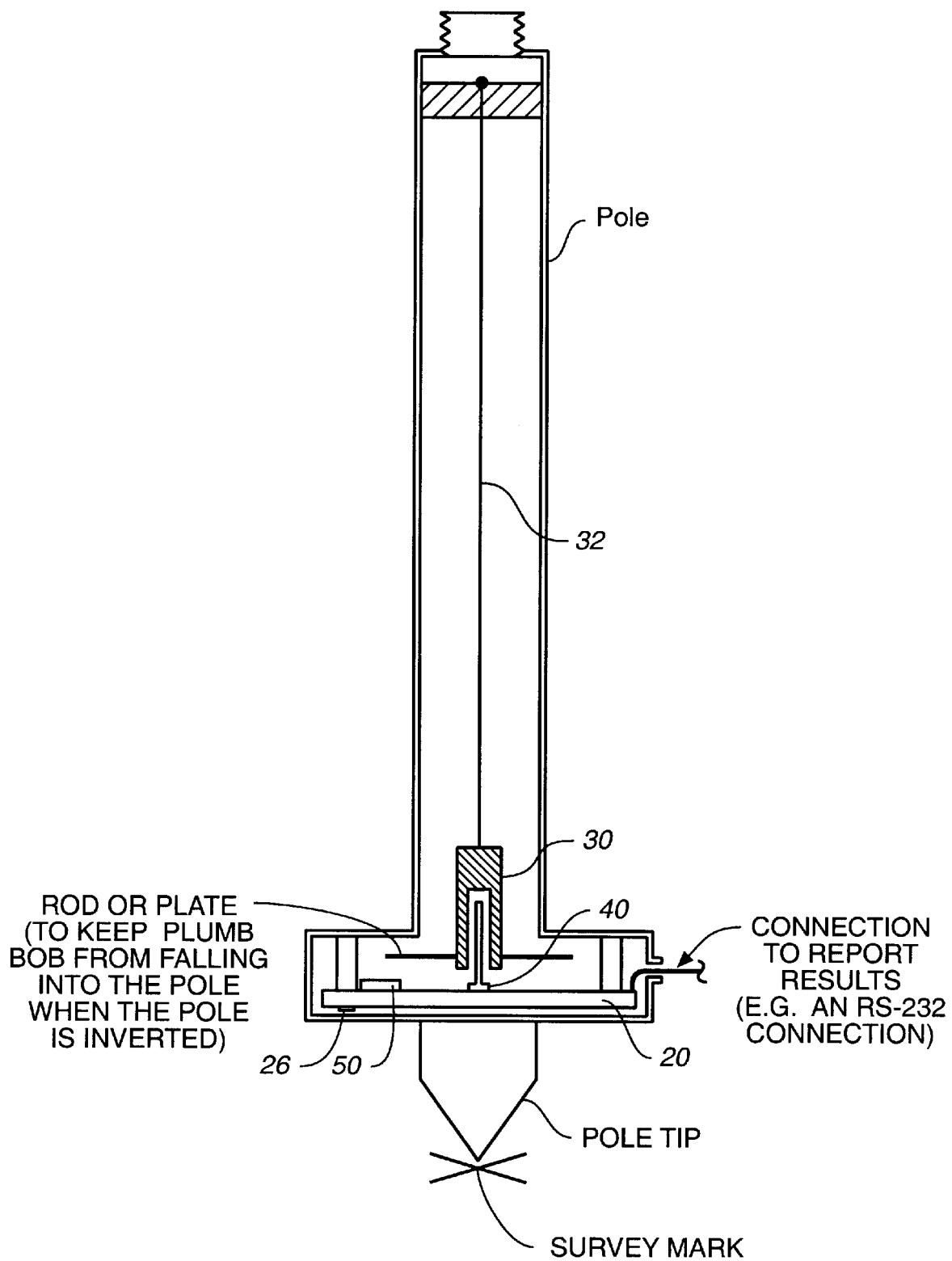
FIG._3

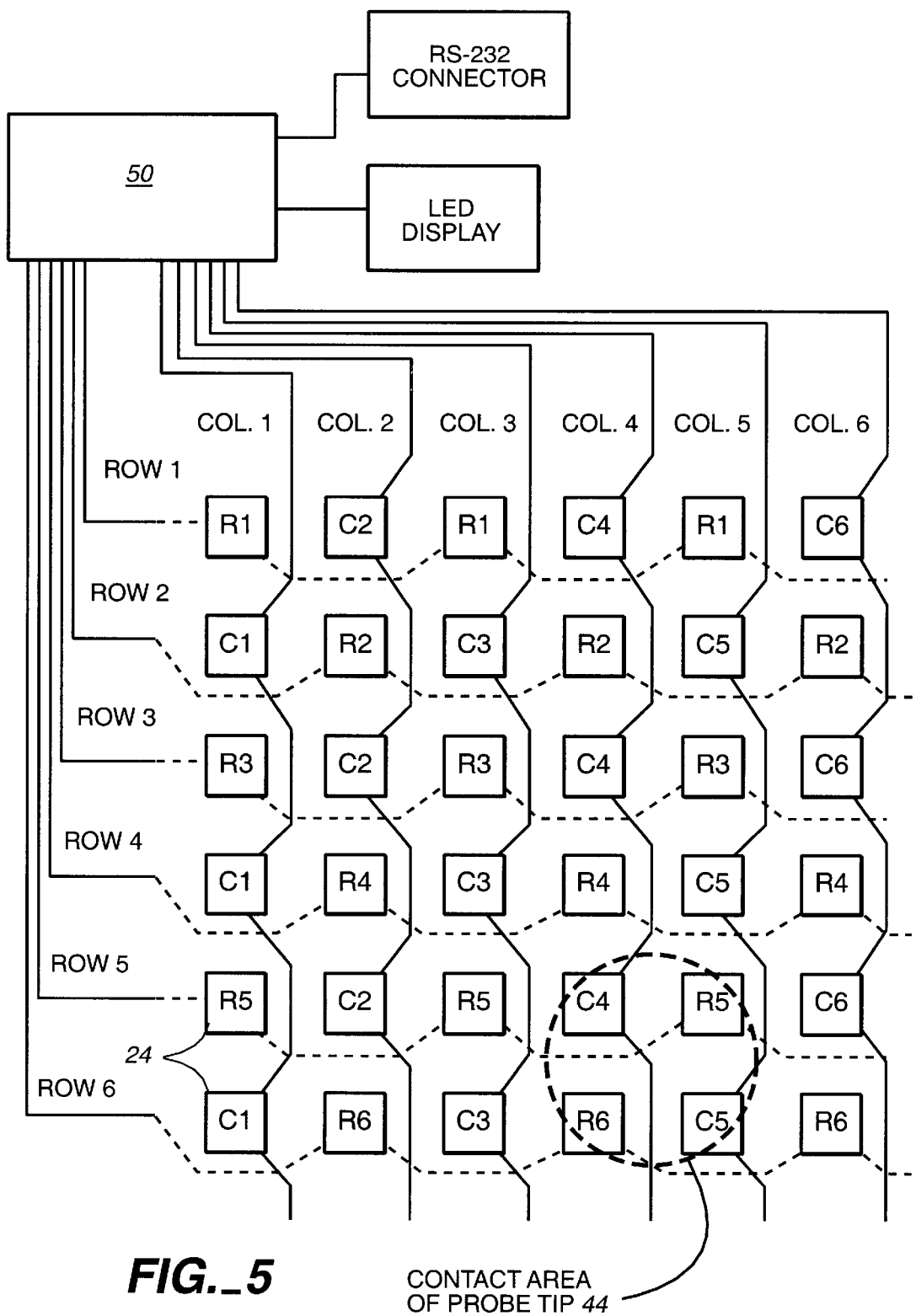
FIG._5
CONTACT AREA OF PROBE TIP 44

ELECTRONIC PLUMB INDICATOR FOR MONOPOLES, SURVEY POLES, GLOBAL POSITIONING ANTENNAS AND THE LIKE

CROSS-REFERENCE TO RELATED APPLICATIONS

This application claims the benefit priority under 35 U.S.C. §119(e) to U.S. patent application Ser. No. 60/199,078, filed Apr. 20, 2000, the contents of which is incorporated herein.

FIELD OF THE INVENTION

The present invention relates to electronic plumb indicators for monopoles, survey poles, global positioning antennas and the like.

BACKGROUND OF THE INVENTION

There is a need in the surveying art and the global positioning (GPS) art to increase the speed and accuracy at which surveying poles and GPS antenna poles are plumbed to vertical positions.

SUMMARY OF THE INVENTION

Broadly stated, the present invention encompasses a plumb indicator comprising a substrate, a plumb bob suspended by a thread (e.g., wire, cable, string, etc.) and disposed over a first surface of the substrate, and a probe. The substrate has an array of conductive pads disposed over its first surface, preferably in a regular pattern. The probe has a first body portion in contact with a surface of the plumb bob, and a conductive tip disposed between the plumb bob and the first surface of the substrate. The probe tip makes contact with the first surface of the substrate, and contacts one or more pads in normal operation. The pads may be scanned electronically to determine the location of the probe tip and plumb bob with respect to the substrate.

In preferred embodiments of the present invention, the plumb bob comprises an elongated mass and cylindrical bore along a portion of the vertical center axis of the elongated dimension. Also in these preferred embodiments, the first body portion of the probe comprises a cylindrical shaft which is disposed within the cylindrical bore in the plumb bob, and the tip of the probe has a rounded or flat surface for contact with the first surface of the substrate.

BRIEF DESCRIPTION OF THE DRAWINGS

FIG. 1 shows a first exemplary embodiment of a plumb indicator according to the present invention.

FIG. 2 shows a cross-sectional view of the exemplary plumb bob and probe shown in FIG. 1 according to the present invention.

FIG. 3 shows the first exemplary plumb indicator of FIG. 1 using a second exemplary plumb bob and disposed within an exemplary pole housing according to the present invention.

FIG. 4 shows a cross-sectional view of a second exemplary plumb bob according to the present invention.

FIG. 5 is a top plan view of a portion of the top surface of a substrate according to the present invention showing an exemplary layout of contact pads according to the present invention.

DETAILED DESCRIPTION OF THE INVENTION

FIG. 1 shows an exemplary plumb indicator 10 according to the present invention. Plumb indicator 10 comprises a substrate 20 which has a first surface 21 and an array of conductive pads 24 disposed over the first surface 21. A plurality of mounting holes 26 are provided in substrate 20 for mounting substrate 20 to a surveying pole or monopole, as described below in greater detail with reference to FIG. 3. Other mounting means may be employed in the present invention, and the particular mounting means employed is not critical to the practice of the present invention.

Plumb indicator 10 further comprises a plumb bob 30 suspended by a thread 32 and disposed over first surface 21 of substrate 20, and further comprises a probe 40 held by plumb bob 30. The weight and positioning of plumb bob 30, and the connection of thread 32 to a point on the vertical center axis of bob 30, enable the vertical center axis of bob 30 to be substantially perpendicular to substrate 20 when indicator 10 is placed in a plumb position. In a preferred embodiment, as shown in the cross-sectional view of FIG. 2, probe 40 has a body portion 42 which fits within a cylindrical bore 34 made at the bottom of plumb bob 30 and along the vertical center axis of plumb bob 30, and a conductive tip 44 disposed at the lowermost distal end of body portion 42. Body portion 42 and bore 34 both preferably have circular cross-sections. Body portion 42 freely moves in the vertical direction within bore 34, and portions of the outer surface of body portion 42 contact with respective portions of the inner surface of bore 34 to keep body portion 42 and probe 40 aligned substantially parallel with the vertical center line of plumb bob 30. This in turn places the probe 40 in a position which is perpendicular to substrate 20 when indicator 10 is placed in the plumb position with respect to the earth (due to gravity, plumb bob 30 seeks a stationary state where its vertical center axis is perpendicular to the surface of the earth).

Probe tip 44 can have a flat surface with beveled edges, or a rounded surface (e.g., spherical, hemispherical, or semi-hemispherical) for contact with surface 21 of substrate 20 and the pads 24 thereon. In the former case, there preferably is a sufficient gap between the sidewalls of probe body 42 and bore 34 to allow probe tip 44 to remain flat through the arc motion of plumb bob 30. Probe tip 44 may have a conductive rubber coating on its surface to minimize scratching of the conductive pads 24 while plumb bob 30 freely moves around above substrate 20 during the plumbing process. Probe 40 touches pads 24 on accord of its own weight, and does not require a spring behind it. The position of plumb bob 30 relative to substrate 20 is found by determining which pads 24 are being contacted by probe tip 44. As one example, a voltage (or ground) may be applied to metal bob 30 through thread 32 and coupled to a metal probe 40 by surface contact with bore 34, and the pads 24 may be scanned electronically to detect which pad or pads have the same potential as bob 30. A detector 50, which preferably comprises a microprocessor unit, may be used for the scanning and detection, and digital multiplexers may be used to selectively group the pads for scanning. As another way, the pads 24 may electrically coupled in a row-column format so that probe tip 42 electrically couples at least one row with at least one column. The rows and columns may be scanned by detector 50 to determine which rows are being coupled to which columns by tip 42. In this case, there is no need to couple an electrical potential to thread 32, although such can be done. This embodiment is described in greater detail below with respect to FIG. 5. To achieve a 1 mm accuracy in finding the position of probe 40 on first surface 21, the pads may be set to square dimensions of 0.2 mm on a side and spaced apart from one another by gaps of 0.2 mm, and the probe tip 44 may be formed to provide a contact area to surface 21 of 0.5 mm.

In one embodiment according to the present invention, plumb bob 30 comprises a cylinder of heavy material with a diameter of 10 mm, a height of 100 mm, a center bore 34 of 1 mm to accommodate free vertical motion of a 0.6 mm diameter probe 40. The top end of thread 32 and substrate 20 may each be fixed to a housing or other support means of any desired type, and substrate 20 and/or the top end of thread 32 may be aligned so that probe tip 44 comes to rest on a particular set of one or more pads when plumb bob 30 is in the plumb (vertical) position with respect to the earth.

Referring to FIG. 3, plumb indicator 10 can be housed inside a pole, such as a surveying pole or a monopole used to position a GPS antenna (in the latter case, the GPS antenna is mounted to the top of the monopole). Substrate 20 is affixed to a widened portion of the pole with mounting screws that pass through the mounting holes 26. The top of thread 32 may be fixed to the pole by a plug assembly disposed within the tube near the top end and secured thereto by screws, glue, or other attachment means. The plug assembly preferably centers thread 32 within the tubing of the pole at the top of the pole. Mounting holes 26 may have sufficient diameter with respect to the securing screws to enable a controlled amount of lateral movement of substrate 20 with respect to the vertical axis of the pole. With this lateral movement, substrate 20 may be aligned so that probe tip 44 contacts a desired set of pads 24 when plumb bob is placed in the plumb position.

As shown in FIG. 4, plumb bob can also have side bars to protect it against falling down into the inside of the pole, if the pole is held upside down. An annular plate may also be used for this purpose. The pole may have a typical diameter of 30 mm and plumb bob 30 may have a typical diameter of 10 mm, in which case the motion of the plumb bob and the probe 40 is contained within a circle having a diameter of 20 mm (30 mm diameter of the pole minus 10 mm diameter of the plumb bob).

FIG. 5 shows a top plan view of a preferred embodiment for laying out contact pads 24. A partial array of six rows R1–R6 and six columns C1–C6 is shown. The pads 24 are arranged in a checker-board red/black arrangement: row pads being assigned to red blocks, and column pads being assigned to black blocks. All of the pads of each row are electrically connected together and routed to an input/output port of detector 50, and all of the pads of each column are electrically connected together and routed to a input/output port of detector 50. The connection and routing may be readily accomplished by using a multi-layer printed circuit board where the pads are formed on the top metal layer, where another wiring layer of the board is used to couple the pads of respective rows together with a plurality of metal traces and a plurality of vias to the row pads, and yet another wiring layer is used to couple the pads of respective columns together with a plurality of metal traces and vias to the column pads. These metal traces in the underlying metal layers are shown by dashed lines in FIG. 5. Using a square pad area of 0.2 mm on a side, and a spacing distance of 0.2 mm between pads, 50 rows and 50 columns can cover a 20 mm by 20 mm square area. The surface area covered on substrate 20 by probe tip 44 is shown by a broad dashed circle in FIG. 5. In one implementation, a voltage (such as either supply $V_{DD}$ or ground) is applied to probe tip 44, and each row and column is wired to another voltage (such as either ground or supply $V_{DD}$) through a respective resistor. The probe tip will bring the columns and rows which it overlies to its potential, and this potential can be detected by scanning all the rows and columns and looking for a digital logic level that corresponds to the voltage of the probe tip 44.

As another implementation, no voltage is applied to probe tip. Each row is coupled to one of the digital logic potentials (such as either ground or $V_{DD}$) through a respective resistor. Detector 50 then selectively applies the opposite digital logic voltage, referred to herein as the "test voltage," to each column while scanning all the rows to determine if a row has the voltage of the selected column. To speed this process, a binary-tree scan search may be done. For example, the test voltage may be first applied to column 1–25 to see if there is a match, and then to columns 26–50 if no such match is found. If a matching row is found when the test voltage is applied to columns 1–25 (or alternatively to columns 26–50), then the search is narrowed by applying the test voltage to columns 1–12 (or alternatively to columns 26–37), and then to columns 13–25 (alternatively 38–50) if no match is found in columns 1–12 (alternatively 26–37). This process is continued until a small set of rows and columns are reached, at which point the test voltage can be individually applied to the columns of the small set. Of course, an equivalent implement of the above may be made by interchanging the function of the rows and columns. As a modification, multiplexed row and columns buffers may be used to connect the rows and columns to detector 50, which may be a microprocessor. The above approach may find that tip 44 covers two rows at a time, and/or two columns at a time. If so, the position may be computed as being between the adjacent rows and columns (i.e., average the positions of the affected rows and columns).

Detector 50 does not need to wait for plumb bob 30 to be stationary. It may scan the entire pads at least 50 times per second and determines the center of the motion. The period of the motion of plumb bob 30 (which is a pendulum) is $2*Pi*SQRT(L/g)$, where L is the length of the thread and g is the gravity constant. For a one meter length L, the period is about 2 seconds. Detector 50 can read at least one pendulum cycle of data (at least 100 snapshots) with a period, and from this determine the center of the pendulum swing relative to the center of the array of pads 24.

Detector 50 can show the results by a LED display or by sending them via serial port (RS-232 connection or other types of connection ports to a handheld device that shows the location of the plumb bob graphically. The operator may use the information to plumb the pole, or the computer can take the offset into account to determine the location of the survey point. In the latter case the pole must be oriented according a convention known to the handheld device.

It may be appreciated that pads 24 may be arranged in a radial pattern, with the rows being concentric circles disposed around the center point of substrate 20, and the columns being disposed radially form the center point. In this implementation, the probe tip 44 resides at the center point when plumb bob 30 is in the vertical plumb position. It may also be appreciated that larger pads may be used at the outer edges of the array, such as by replacing a 2-by-2 grouping of pad by a single pad that occupies the same area.

While the present invention has been particularly described with respect to the illustrated embodiments, it will be appreciated that various alterations, modifications and adaptations may be made based on the present disclosure, and are intended to be within the scope of the present invention. While the invention has been described in connection with what is presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. A plumb indicator comprising:
    a substrate comprising a first surface and an array of conductive pads disposed over the first surface, the conductive pads being disposed in a pattern of rows and columns wherein every other pad in a row is electrically connected together and wherein every other pad in a column is electrically connected together;
    a plumb bob suspended by a thread and disposed over the first surface of the substrate, said plumb bob having a first surface; and
    a probe having first body portion having portions thereof in contact with portions of the first surface of the plumb bob, and further having a conductive tip disposed between the substrate.

2. The indicator of claim 1 wherein the probe does not restrict the motion of the plumb bob.

3. The indicator of claim 1 wherein the probe tip has a contact area which is sufficient to contact a plurality of conductive pads at one time.

4. The indicator of claim 1 further comprising a detector coupled to the array of pads for sensing one or more conductive pads which are in contact with the probe's conductive tip.

5. The indicator of claim 1 wherein no voltage is applied to the probe tip from the thread.

6. The indicator of claim 1 further comprising a detector coupled to the array of pads which selectively applies a test voltage to the columns of the pad array and scans the rows for voltages which match the test voltage.

7. The indicator of claim 1 further comprising a detector coupled to the array of pads which selectively applies a test voltage to the rows of the pad array and scans the columns for voltages which match the test voltage.

8. The indicator of claim 1 further comprising a test voltage applied to the probe tip, and a detector coupled to the array of pads which scans the rows and columns for voltages which match the test voltage.

9. The indicator of claim 1 wherein the thread has a first end attached to the plumb bob and a second end attached to a suspension point, wherein the plumb bob is disposed between the suspension point and the substrate's first surface, and wherein the plumb bob has a center of gravity which is closer to the substrate's first surface than the suspension point.

10. A plumb indicator comprising:
    a substrate comprising a first surface and an array of conductive pads disposed over the first surface;
    a plumb bob suspended by a thread and disposed over the first surface of the substrate, the plumb bob having a first surface; and
    a probe having first body portion having portions thereof in contact with portions of the first surface of the plumb bob, and further having a conductive tip disposed between the plumb bob and the first surface of the substrate and in contact with the first surface of the substrate, the probe tip having a contact area which is sufficient to contact a plurality of conductive pads at one time.

11. The indicator of claim 10 wherein the pads are disposed in a matrix pattern on the first surface of the substrate.

12. The indicator of claim 10 further comprising a detector coupled to the array of pads for sensing one or more conductive pads which are in contact with the probe's conductive tip.

13. The indicator of claim 10 wherein no voltage is applied to the probe tip from the thread.

14. The indicator of claim 10 wherein the thread has a first end attached to the plumb bob and a second end attached to a suspension point, wherein the plumb bob is disposed between the suspension point and the substrate's first surface, and wherein the plumb bob has a center of gravity which is closer to the substrate's first surface than the suspension point.

15. A plumb indicator comprising:
    a substrate comprising a first surface and an array of conductive pads disposed over the first surface;
    a plumb bob suspended by a thread and disposed over the first surface of the substrate, the plumb bob having a first surface; and
    a probe having first body portion having portions thereof in contact with portions of the first surface of the plumb bob, and further having a conductive tip disposed between the plumb bob and the first surface of the substrate and in contact with the first surface of the substrate; and
    wherein no voltage is applied to the probe tip from the thread.

16. The indicator of claim 15 further comprising a detector coupled to the array of pads for sensing one or more conductive pads which are in contact with the probe's conductive tip.

17. The indicator of claim 15 wherein the thread has a first end attached to the plumb bob and a second end attached to a suspension point, wherein the plumb bob is disposed between the suspension point and the substrate's first surface, and wherein the plumb bob has a center of gravity which is closer to the substrate's first surface than the suspension point.

18. A plumb indicator comprising:
    a substrate comprising a first surface and an array of conductive pads disposed over the first surface;
    a plumb bob suspended by a thread and disposed over the first surface of the substrate, the plumb bob having a first surface, the thread having a first end attached to the plumb bob and a second end attached to a suspension point, the plumb bob being disposed between the suspension point and the substrate's first surface, and the plumb bob having a center of gravity which is closer to the substrate's first surface than said suspension point; and
    a probe having first body portion having portions thereof in contact with portions of the first surface of the plumb bob, and further having a conductive tip disposed between the plumb bob and the first surface of the substrate and in contact with the first surface of the substrate.

19. The indicator of claim 18 further comprising a detector coupled to the array of pads for sensing one or more conductive pads which are in contact with the probe's conductive tip.

20. A plumb indicator comprising:
    a hollow elongated pole having a top end, a bottom end, a widened portion closer to the bottom end than the top end, and a tapered pole tip disposed at the bottom end of the pole;
    a substrate disposed within the widened portion of the hollow elongated pole, the substrate comprising a first surface and an array of conductive pads disposed over the first surface;
    a plumb bob suspended by a thread and disposed over the first surface of the substrate, said plumb bob having a first surface, the thread and plumb bob being disposed within the hollow elongated pole; and a probe having first body portion having portions thereof in contact with portions of the first surface of the plumb bob, and further having a conductive tip disposed between the plumb bob and the first surface of the substrate and in contact with the first surface of the substrate.

* * * * *

UNITED STATES PATENT AND TRADEMARK OFFICE
CERTIFICATE OF CORRECTION

PATENT NO. : 6,594,912 B2
DATED : July 22, 2003
INVENTOR(S) : Javad Ashjaee

It is certified that error appears in the above-identified patent and that said Letters Patent is hereby corrected as shown below:

Column 5,
Line 12, after the first instance of "having" insert -- a --.
Line 15, after "between" insert -- the plumb bob and the first surface of the substrate and in contact with the first surface of the --.
Line 52, after the first instance of "having" insert -- a --.

Column 6,
Lines 16 and 47, after the first instance of "having" insert -- a --.

Column 7,
Line 3, after the first instance of "having" insert -- a --.

Signed and Sealed this

Twelfth Day of October, 2004

JON W. DUDAS
*Director of the United States Patent and Trademark Office*